United States Patent

Barkley et al.

[11] 3,837,058
[45] Sept. 24, 1974

[54] TOOL HOLDER

[75] Inventors: George G. Barkley, New Alexandria; Edward L. Sorice, Crabtree; Kenneth L. Niebauer, Greensburg, all of Pa.

[73] Assignee: Kennametal Inc., Latrobe, Pa.

[22] Filed: Nov. 15, 1973

[21] Appl. No.: 415,985

[52] U.S. Cl. ................................................ 29/96
[51] Int. Cl. ............................................ B26d 1/00
[58] Field of Search ................... 29/96, 95 R, 105 R

[56] References Cited
UNITED STATES PATENTS 3,192,603  7/1965  Greenleaf ............................... 29/96
3,545,060  12/1970  Kezran ................................... 29/96

FOREIGN PATENTS OR APPLICATIONS 1,347,086  11/1963  France ................................... 29/96

*Primary Examiner*—Leonidas Vlachos
*Attorney, Agent, or Firm*—Melvin A. Crosby

[57] ABSTRACT

A tool holder having a pocket for receiving an insert with a pin stationary in the holder and extending into the pocket while a clamp is adjustably mounted on the holder and engages the insert from the rear and the top and forces the insert against the pin while simultaneously clamping the insert firmly against the bottom of the pocket.

10 Claims, 7 Drawing Figures

PATENTED SEP 24 1974    3,837,058

TOOL HOLDER

The present invention relates to tool holders and is particularly concerned with a tool holder having a novel arrangement for clamping an insert in the pocket provided therefor on the holder.

Tool holders which have pockets for removeably receiving inserts are well known and many times comprise a pin extending into the pocket and engaging a central hole in the insert. The pin is sometimes tiltable or eccentric and can be adjusted for pressing the insert against one or more side walls of the pocket for holding the insert in place in the pocket. In other cases, a clamp is provided which presses the insert down in the pocket. In still other cases, the adjustable pin is combined with a clamp for holding the insert in the pocket.

In every case where the pin is adjustable for pressing the insert backwardly against one or more walls of the pocket, the possibility presents itself that the pin will become loose or badly worn and that the insert will become loose during machining operations.

When only a clamp is used to hold the insert in a pocket, the insert is not always exactly located when the clamp is tightened up.

When an adjustable pin and clamp are both employed, the insert is usually correctly located in the pocket, but two devices must be manipulated to locate the pin and to clamp it in place.

With the foregoing in mind, the present invention proposes a novel arrangement for locating an insert in a pocket provided therefor in a tool holder and for clamping the insert in place in the pocket, utilizing only a single instrumentality to effect the foregoing.

Still another object of the invention is the provision of an arrangement for clamping an insert in the pocket of a tool holder in which the insert is precisely located and can be held under high clamping forces without being broken and wherein the insert does not tend to become loose during machining operations.

BRIEF SUMMARY OF THE INVENTION

According to the present invention, a tool holder is provided having a pocket for receiving an insert. A pin stationarily mounted in the holder protrudes into the pocket for engagement with a central hole in the insert. The holder includes an adjustable clamp member which is adapted to engage the insert on the side facing away from the open side of the pocket and, also, on top of the insert.

The end of the clamp member opposite the insert engages an inclined wall formed on the holder and, as the clamp member is tightened up on the holder, it slides down the aforementioned inclined wall and thereby presses the insert tightly against the pin while simultaneously engaging the insert on top and pressing it downwardly in the pocket.

According to the present invention, the region of the clamp member which engages the inclined wall is slightly resilient and, in this manner, the clamp is pressed against the back of the insert in such a manner that the insert will not become loose during machining operations if the insert and holder is placed under severe load or is caused to vibrate.

The exact nature of the present invention will become more apparent upon reference to the following detailed specification taken in connection with the accompanying drawings in which.

DETAILED DESCRIPTION OF THE INVENTION

Figure 1:
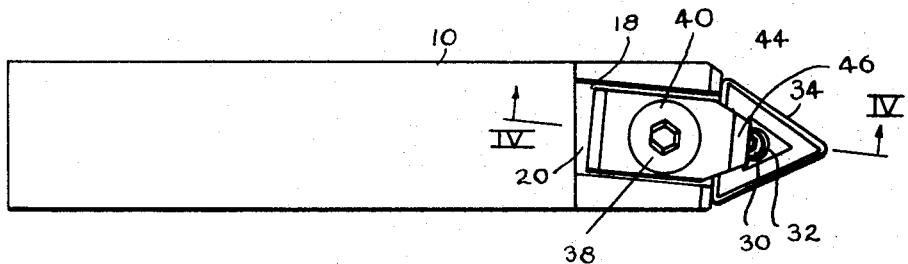
FIG. 1 is a plan view of a tool holder arrangement according to the present invention.
Figure 2:
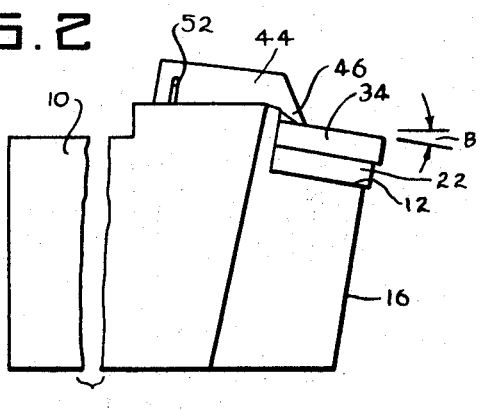
FIG. 2 is a side view of the holder of FIG. 1 partly broken away.
Figure 4:
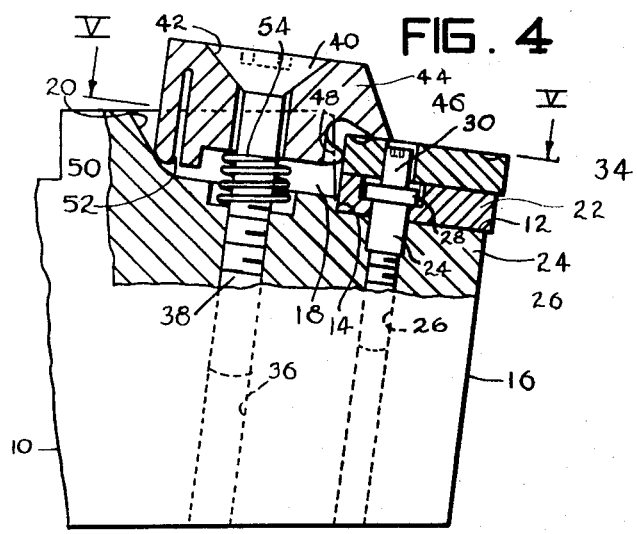
FIG. 4 is a fragmentary longitudinal section drawn at enlarged scale and indicated by line IV—IV on FIG. 1.

Referring to the drawings more in detail, and with particular reference to FIGS. 1 to 6, the tool holder comprises a bar-like member 10 having a pocket formed in one end thereof, the said pocket best being seen in FIGS. 2 and 4 and consisting of a lower wall 12 and a back wall 14 upstanding from the said lower wall.

The holder at the end having the pocket formed therein tapers inwardly to a generally vertical edge 16 so that the holder is adapted for receiving a triangular insert. Inserts of other shapes could also be employed in the holder by properly shaping the forward end of the holder in which the pocket is formed.

The holder also comprises a recess 18 extending rearwardly therein from the insert pocket and at the rear end of recess 18 there is provided an inclined wall 20 which converges in the downward direction with a perpendicular to the plane of bottom wall 12 of the pocket.

The bottom wall 12 of the pocket may receive the insert directly, but it is advantageous to mount on the bottom wall a shim 22 which may be formed of hard wear resistant material and which forms a protective barrier between the insert and the holder as well as providing a smooth surface on which the insert can be mounted.

Shim 22 rests on bottom wall 12 and has one edge closely adjacent the upstanding wall 14 at the back of the pocket.

Shim 22 is held in place by a pin 24 threaded into threaded hole 26 formed in the holder and extending perpendicularly through bottom wall 12 and in about the region of the geometric center thereof. Pin 24 has a flange 28 formed thereon which is received in a counter bore formed in shim 22 so that the shim is clamped firmly against bottom wall 12 of the pocket by the pin.

Above flange 28, the pin has a cylindrical protrusion 30 adapted to be received in center hole 32 of the insert 34 resting on the top of shim 12. The insert 34 is larger than the shim 22 and thereby protrudes forwardly from the front edge of the shim as will be seen in FIGS. 2 and 4.

Rearwardly of threaded bore 26 and preferably parallel thereto is a further threaded bore 36 which threadedly receives a clamp screw 38 having a conical head 40 receivable in a conical recess formed in clamp member 44. The head of the clamp screw and the recess therefor could, of course, be other than conical. Clamp member 44 is generally cubical and at the forward end has a lip 46 that overhangs insert 34 so as to engage the top wall thereof at a region spaced forwardly from the rear edge of the insert and rearwardly from center hole 32 of the insert.

In about the region of the center of the heighth of the insert, clamp member 44 is formed with a pair of laterally spaced protrusions 48 which form rounded noses which engage the insert from the rear. The lateral spacing of the protrusions 48 will be seen in FIG. 5, wherein it will be noted that each thereof engages the back wall of the insert about midway between the longitudinal center line of the insert and the lateral extremities thereof.

The rearward end of clamp member 40 at the lower edge thereof is rounded as at 50 and engages inclined wall 20. Forwardly of the rear wall of the clamp member, the clamp member is formed with a slot 52 extending therein from the bottom whereby the rounded edge portion 50 at the bottom of the rear wall is somewhat resilient.

Finally, there is advantageously a compression spring 54 provided between the bottom of the clamp member 40 and the tool holder so that the clamp member is sprung in the upward direction so that it can easily be loosened to replace or index the insert which it clamps in the holder. A snap ring on the screw 38 beneath the clamp member 44 can be used to advantage in place of spring 54.

In operation, with the clamp member loosened, an insert is placed in the holder with the cylindrical protrusion 30 engaging the hole in the insert. Screw 38 is then tightened up and this forces the clamp member downwardly and as the lower rear edge of the clamp member slides down inclined wall 20, the lip 46 of the clamp member and the protrusions 48 will be brought into firm engagement with the insert thereby to force the insert downwardly toward the bottom wall of the pocket and forwardly against cylindrical projection 30 of pin 24.

The pin determines the forward position of the insert in the pocket and the laterally spaced protrusions and inclined plane determine the angularity of the insert about the axis of the pin so that the clamp member is operable for effecting precise location of the insert on the holder. At the same time, the clamp member is particularly effective for tightly clamping the insert in the accurately located position thereof and is especially effective in view of the resilience of the rear lower edge 50 which is imparted thereto by the slot 52.

Figure 3:
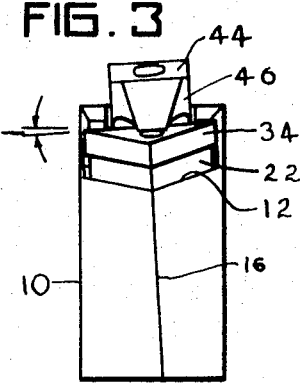
FIG. 3 is a front view of the holder.

The end of lip 46 which engages the insert is relatively narrow as will be seen in FIGS. 1 and 3 and engages a limited region of the insert but which region is of sufficient area that the stresses developed by the clamp member on the insert are well within allowable limits.

Similarly, the protrusions 48 engage the insert in a region thereof which is strong and, likewise, do not create any stresses in the insert beyond the allowable limit.

As will be seen in FIG. 2, the insert is advantageously tilted downwardly toward the front at an angle B which may be up to, for example, 6° or 7°. Similarly, as will be seen in FIG. 3, the insert may be tilted downwardly toward one side at an angle C which may, also, be on the order of, for example, about 6° or 7°.

Figure 5:
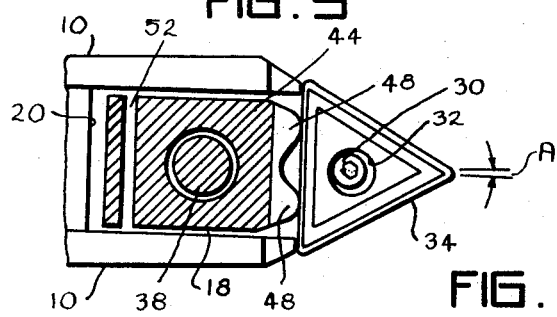
FIG. 5 is a partial plan sectional view indicated by line V—V on FIG. 4.

Still further, and as indicated in FIG. 5, the fore and aft central axis of the insert could be inclined relative to the fore and aft central axis of the tool holder by an angle A and which, for example, might be on the order of 2° or 3°.

The aforementioned tilting and inclining of the insert in the pocket is provided for establishing the proper machining conditions so that the insert will have proper front clearance and side clearance when it is brought into operative engagement with a workpiece to be machined thereby.

Figure 6:
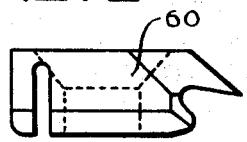
FIG. 6 is a side view showing the clamp member of FIGS. 1 to 5.

A clamp member 60, similar to that of FIGS. 1 to 5, will be seen in FIG. 6. The difference between clamp member 60 of FIG. 6 and clamp member 44 of FIGS. 1 to 5 is that the clamp member in FIG. 6 is somewhat thinner in the top to bottom direction and the incline on the front end leading down on the top of the front lip is at a steeper angle to the vertical, whereby the clamp member of FIG. 6 can be used where there are space limitations that do not permit the use of the clamp member such as is shown in FIG. 4.

Figure 7:
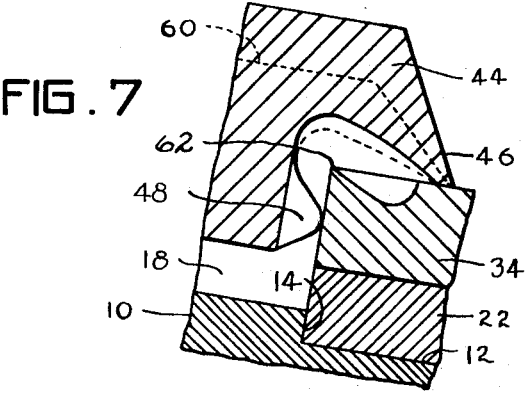
FIG. 7 is a fragmentary view showing a clamp member similar to that of FIG. 6 but having a lower profile.

FIG. 7 shows how a clamp member, which may be either clamp member 44 of FIG. 4 or clamp member 60 of FIG. 6, is so constructed that the adjacent cutting edge 62 of the insert being clamped thereby is exposed and thereby safe from damage by the clamp member.

FIG. 7 also shows the small area of contact of the forward end of the lip with the insert. The same reference numerals applied to FIG. 4 have been employed for FIG. 7. The clamp member in full lines is the same as clamp member 44 of FIG. 4 and is so referenced while the dotted outline clamp member is that of FIG. 6 and is referenced 60.

Modifications may be made within the scope of the appended claims.

What is claimed is:

1. A bar-like tool holder having a pocket formed in one end thereof to receive a cutting insert, said pocket having an upwardly facing bottom wall, a pin in the holder extending upwardly into said pocket to engage a hole in a insert placed in the pocket, an inclined wall formed on said holder rearwardly of said pocket in a plane which diverges from the axis of said pin in the upward direction, a clamp element having a rear end adapted to engage said inclined wall and a forward end adapted to engage the rear side of an insert in said pocket, and means for forcing said clamp element downwardly on said holder thereby to wedge said clamp element between the said inclined wall and the rear side of an insert in said pocket, the forward end of said clamp element comprising a forwardly protruding lateral rib which engages an insert in the pocket below the top of the insert, said forwardly protruding rib being relieved along the intermediate portion thereof to prevent the application of clamping pressure to that region of the rear side of the insert which is in longitudinal alignment with the hole in the insert.

2. A tool holder according to claim 1 in which said clamp element includes a lip protruding forwardly from the forward edge at the top to engage the top of an insert in said pocket.

3. A tool holder according to claim 1 in which said clamp element includes a lip protruding forwardly from the forward edge at the top to engage the top of an insert in said pocket, said lip inclining downwardly toward the forward end so as to have clearance from the rearward edge of an insert in said pocket.

4. A tool holder according to claim 1 in which said clamp element has a transverse slot formed therein near the rearward end and extending upwardly into the clamp element a substantial distance thereby to impart resilience to the portion of said clamp element which engages said inclined wall.

5. A tool holder according to claim 1 in which said clamp element is block-like and has a lip projecting forwardly and downwardly from the top of the forward end to engage the top of an insert in said pocket forwardly of the rear edge thereof, a clamp screw extending downwardly through said clamp element and into said holder to draw the clamp element downwardly on the holder, the lower rearward corner of said clamp element engaging said inclined wall, and a slot extending transversely in said clamp element near the rearward end of the clamp element and extending upwardly from the bottom of the clamp element thereby to impart resilience to said corner of the clamp element which engages said inclined wall.

6. A tool holder according to claim 1 in which said pin threadedly engages a threaded bore in said holder extending through the bottom wall of said pocket and perpendicular thereto.

7. A tool holder according to claim 1 in which said means for forcing said clamp element downwardly comprises a clamp screw extending through said clamp element from above and threadedly engaging a second threaded bore in said holder which is substantially parallel to and spaced rearwardly from said pin.

8. A tool holder according to claim 6 in which said pin has a flange thereon near the upper end, and a shim resting on the bottom wall of said pocket having a hole to receive said pin and a counterbore in the upper end of the hole to receive said flange.

9. A tool holder according to claim 2 in which the forward side of said lip inclines upwardly and rearwardly from the top of an insert engaged by the said lip.

10. A tool holder according to claim 9 in which said lip tapers inwardly toward the forward end to a width substantially smaller than the width of the insert where it is engaged by the lip.

* * * * *